(12) United States Patent
Tupa et al.

(10) Patent No.: US 7,096,887 B2
(45) Date of Patent: Aug. 29, 2006

(54) FLUID VALVE

(75) Inventors: Timothy J Tupa, Springfield, TN (US); William M Pryor, Portland, TN (US)

(73) Assignees: Mueller Industries, Inc., Memphis, TN (US); Electrolux Home Products, Inc., Cleveland, OH (US)

( * ) Notice: Subject to any disclaimer, the term of this patent is extended or adjusted under 35 U.S.C. 154(b) by 35 days.

(21) Appl. No.: 11/040,842

(22) Filed: Jan. 21, 2005

(65) Prior Publication Data

US 2005/0178450 A1   Aug. 18, 2005

Related U.S. Application Data

(60) Provisional application No. 60/544,937, filed on Feb. 13, 2004.

(51) Int. Cl.
*F16K 11/083* (2006.01)

(52) U.S. Cl. ................................. 137/625.47
(58) Field of Classification Search ............ 137/625.47
See application file for complete search history.

(56) References Cited

U.S. PATENT DOCUMENTS

| | | | |
|---|---|---|---|
| 627,019 A | 6/1899 | Streubel | |
| 1,634,409 A * | 7/1927 | Eisenhauer | ............... 210/88 |
| 1,642,296 A * | 9/1927 | Brant | ............ 137/625.29 |
| 1,982,101 A | 11/1934 | Herbster | |
| 2,095,064 A | 10/1937 | Harper | |
| 2,162,232 A | 6/1939 | Schoenberger | |
| 2,162,233 A | 6/1939 | Schoenberger | |
| 2,392,319 A | 1/1946 | Harwood | |
| 2,632,467 A | 3/1953 | Lamar | |
| 2,667,325 A | 1/1954 | Mueller | |
| 2,683,465 A | 7/1954 | Mueller | |
| 2,855,955 A * | 10/1958 | Lamar | ............ 137/599.17 |
| 2,855,956 A * | 10/1958 | Huff et al. | ........... 137/625.32 |
| 3,721,265 A | 3/1973 | Hoffland | |
| 4,021,190 A * | 5/1977 | Dickson | ............... 431/280 |
| 4,355,659 A * | 10/1982 | Kelchner | ............ 137/625.19 |
| 6,401,754 B1 * | 6/2002 | Winquist et al. | ...... 137/625.47 |
| 6,688,333 B1 * | 2/2004 | McLane et al. | ........ 137/625.11 |

* cited by examiner

*Primary Examiner*—John Fox
(74) *Attorney, Agent, or Firm*—Harness, Dickey & Pierce, P.L.C.

(57) ABSTRACT

A dual outlet valve is provided that is capable of obtaining a closed state for both outlet ports, a low flow for either operating port either individually or combined, or a high flow operation mode for either outlet port individually or combined such that at least seven different operating conditions can be obtained.

14 Claims, 5 Drawing Sheets

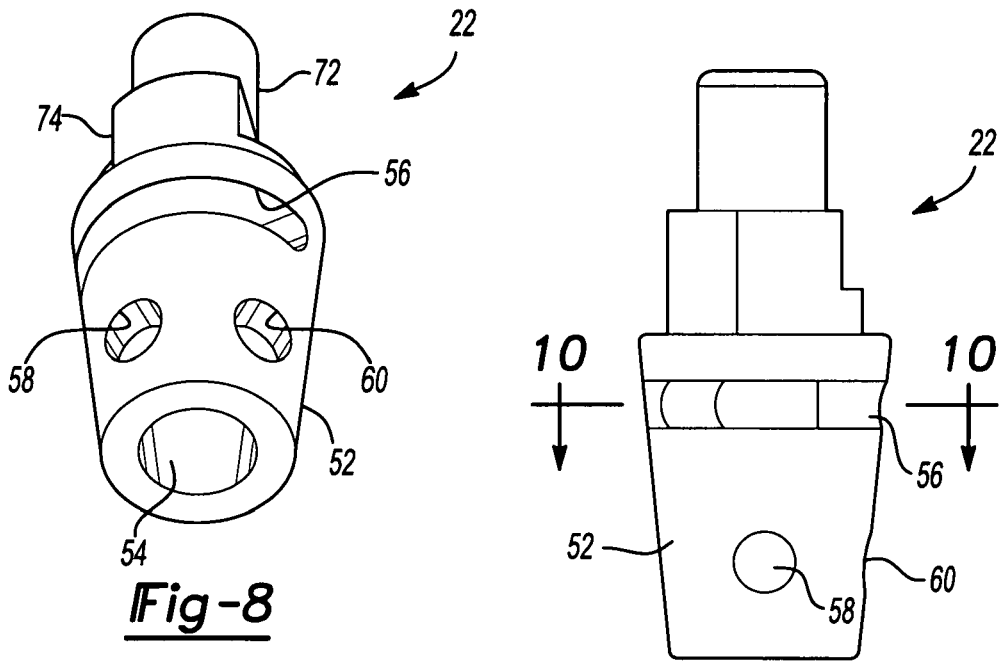
Fig-8
Fig-9
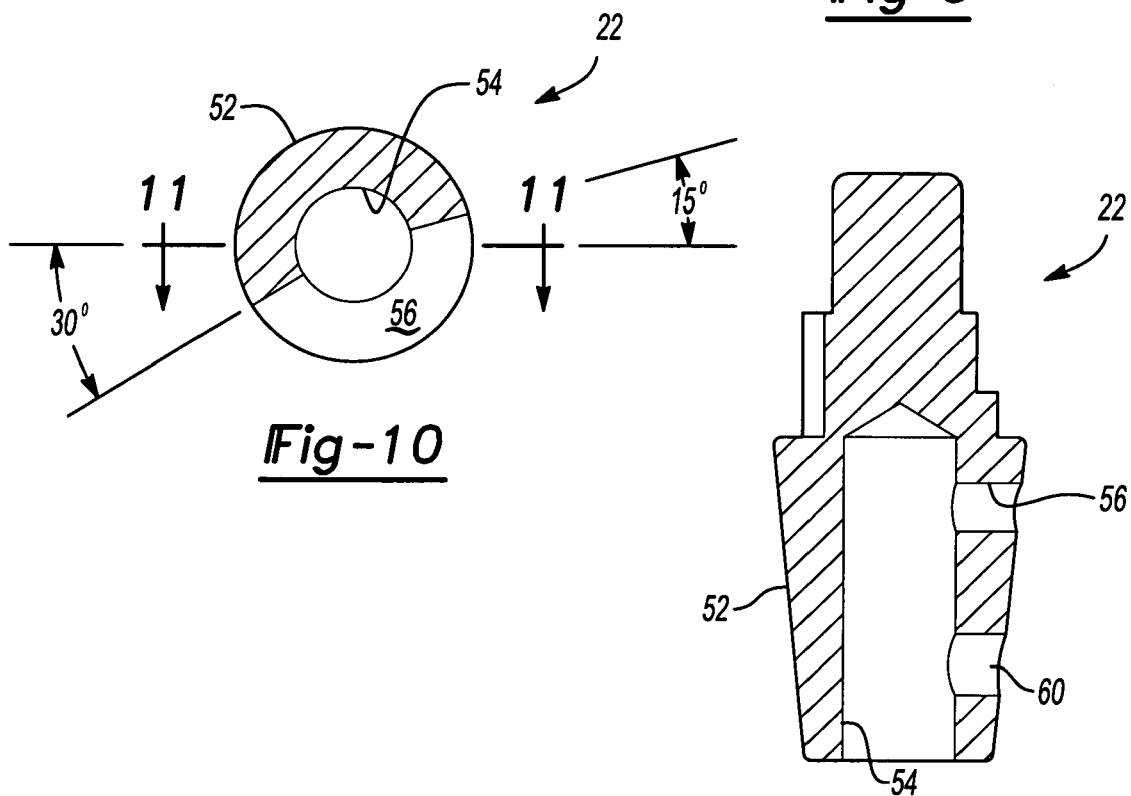
Fig-10
Fig-11

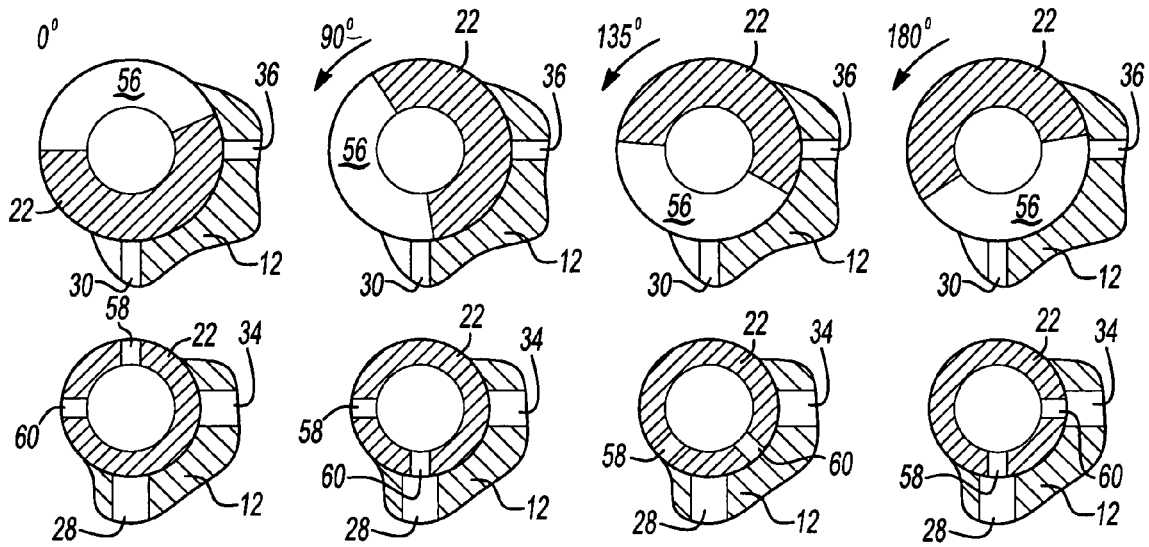
*Fig-14A*  *Fig-14B*  *Fig-14C*  *Fig-14D*
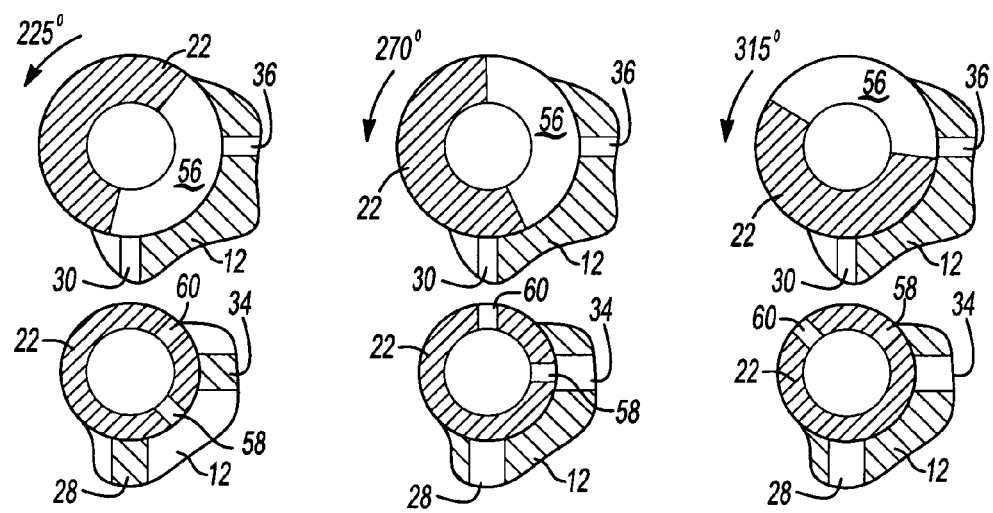
*Fig-14E*  *Fig-14F*  *Fig-14G*

FLUID VALVE

CROSS-REFERENCE TO RELATED APPLICATIONS

This application claims the benefit of U.S. Provisional Application No. 60/544,937, filed on Feb. 13, 2004, the disclosure of which is incorporated herein by reference.

FIELD OF THE INVENTION

The present invention relates to a fluid valve, and more particularly, to a dual outlet gas valve.

BACKGROUND AND SUMMARY OF THE INVENTION

It is generally known to provide a dual outlet gas valve for controlling the supply of gas to a pair of burners. The present invention provides a dual outlet gas valve that allows different rates of gas flow therethrough so that relatively high and relatively low flames may be selectively applied to the pair of burners in several alternative modes of operation.

The present invention provides a valve body having a bore for receiving a plug valve member. The valve body includes an inlet port which communicates with an inlet passage in communication with a bore provided in the end of the plug valve member. The plug valve member includes a radially extending slot and a pair of radially extending apertures, each of which are capable of being positioned in alignment with a first and second pair of outlet passages which communicate with first and second outlet ports. With selective adjustment of the position of the plug valve member, the first and second outlets of the dual outlet valve can individually be provided with a low flow, high flow, intermediate flow, or a closed operating state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a perspective view of the valve plug member according to the principles of the present invention;

FIG. 9 is a front plan view of the valve plug member;

FIG. 10 is a cross-sectional view taken along line 10—10 of FIG. 9;

FIG. 11 is a cross-sectional view taken along line 11—11 of FIG. 10;

FIG. 14A illustrates a pair of cross-sectional views of the valve plug member in a closed position for both outlet port;

FIG. 14B illustrates cross-sectional views of the valve plug member in a high flow position for the first outlet port and a closed position for the second outlet port;

FIG. 14C provides cross-sectional views of the valve plug member positioned to provide a low flow to the first outlet port and a closed second outlet port;

FIG. 14D shows cross-sectional illustrations of the valve member positioned for providing high flow to both of the outlet ports;

FIG. 14E provides cross-sectional views illustrating the valve plug member position for a low flow condition of both of the outlet ports;

FIG. 14F provides cross-sectional views of the plug valve member positioned to provide a closed first outlet port and a high flow for the second outlet port;

FIG. 14G is a cross-sectional view of the plug member positioned to provide a closed first outlet port and a low flow for the second outlet ports;

DETAILED DESCRIPTION OF THE PREFERRED EMBODIMENTS

Figure 1:
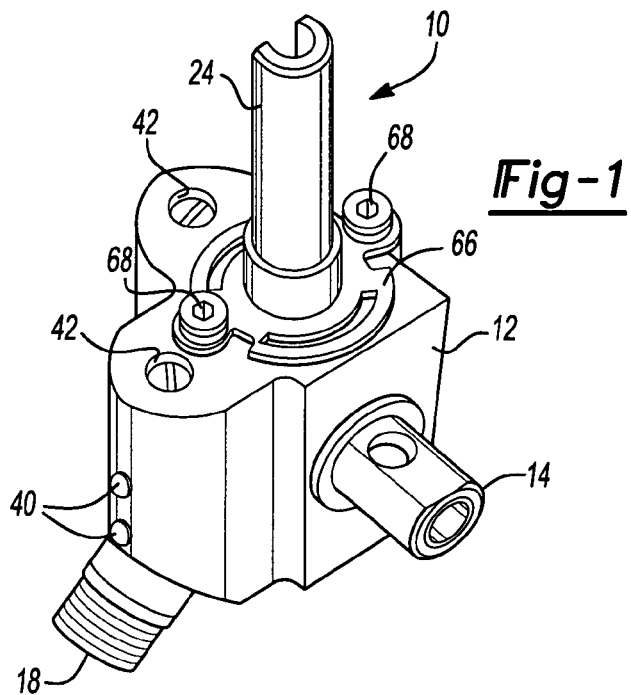
FIG. 1 is a perspective view of the dual outlet valve according to the principles of the present invention.
Figure 2:
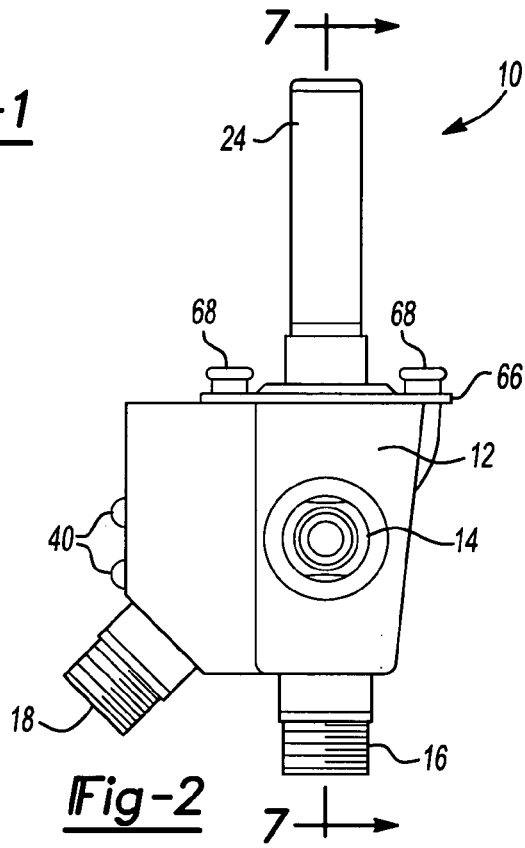
FIG. 2 is a front plan view of the dual outlet valve shown in FIG. 1.
Figure 3:
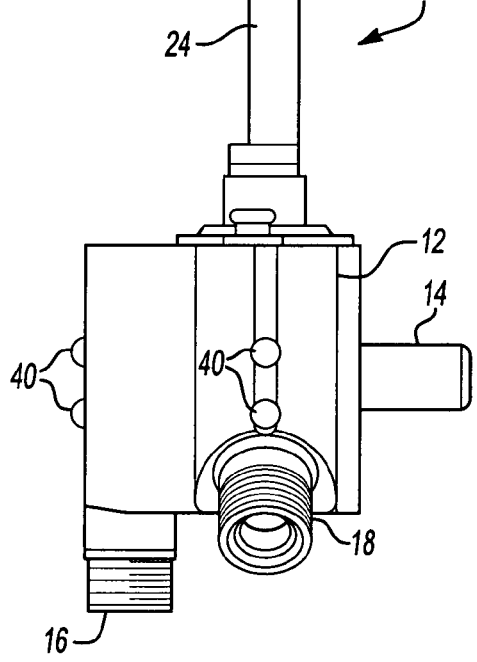
FIG. 3 is a left side plan view of the dual outlet valve.
Figure 4:
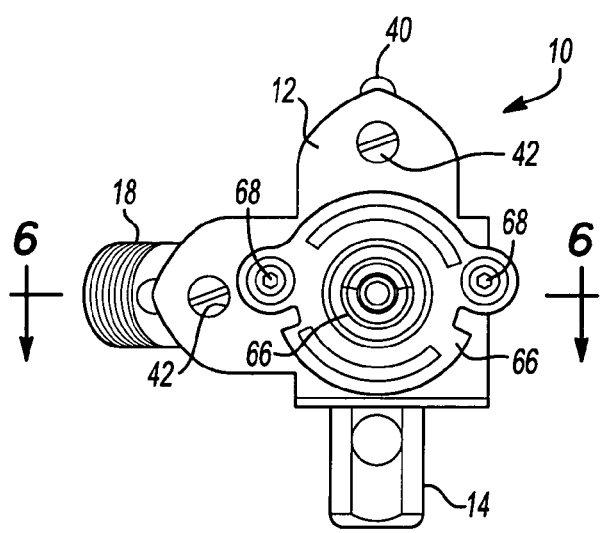
FIG. 4 is a top plan view of the dual outlet valve.
Figure 5:
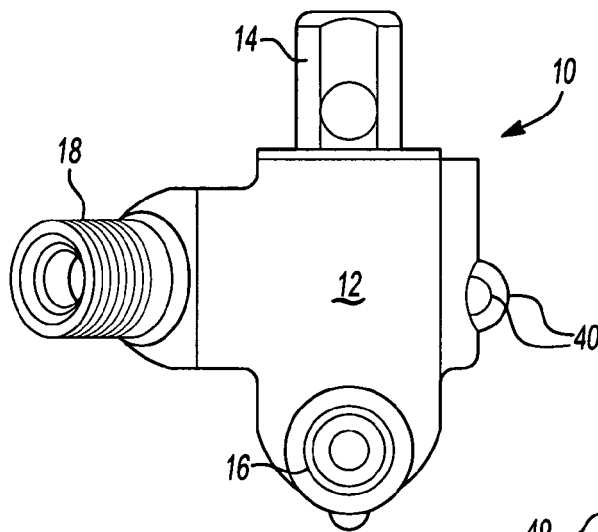
FIG. 5 is a bottom plan view of the dual outlet valve.

The following description of the preferred embodiment(s) is merely exemplary in nature and is in no way intended to limit the invention, its application, or uses.

With reference to the attached figures, the dual outlet valve 10 according to the principles of the present invention will now be described. Dual outlet valve 10 includes a valve body 12 having an inlet port 14, a first outlet port 16, and a second outlet port 18. The valve body 12 includes a bore 20, best shown in FIGS. 6, 7A, 7B. A valve member 22, best shown in FIGS. 8–11 is received in the bore 20 of the valve body 12. A valve stem 24 (best shown in FIGS. 1–4) is attached to the valve member 22 for rotating the valve member 22 within the bore 20 of valve body 12.

Figure 7A:
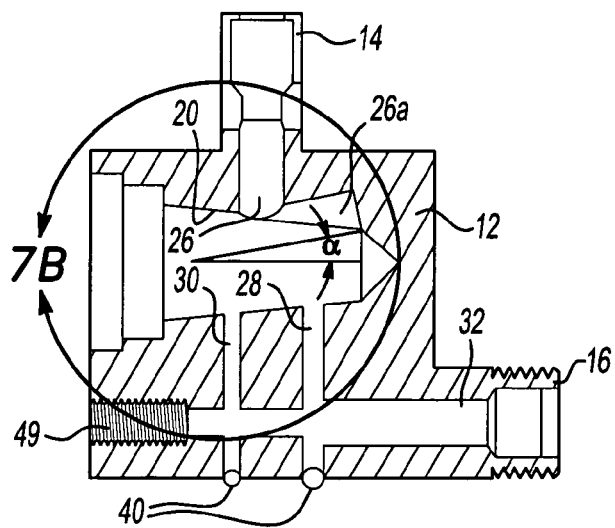
FIG. 7A is a cross-sectional view of the valve body taken along line 7—7 of FIG. 2.
Figure 7B:
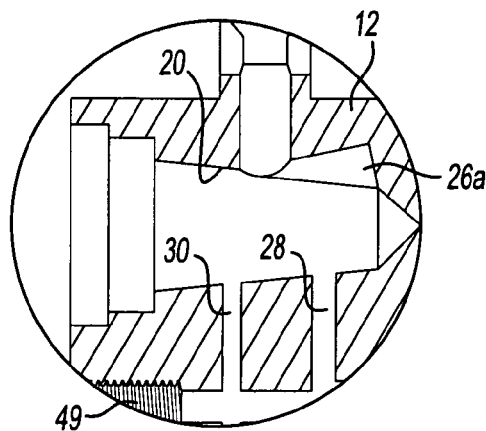
FIG. 7B is a detailed sectional view of the encircled area of FIG. 7A.
Figure 15:
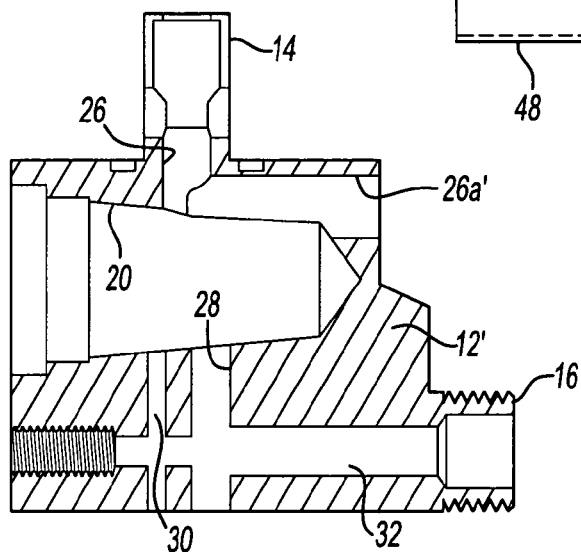
FIG. 15 is a cross-sectional view of a second embodiment of the valve modified from FIG. 7A.

With reference to FIGS. 7A and 7B, the valve body 12 includes an inlet passage 26 which communicates with the bore 20 and inlet port 14. More specifically, the inlet passage 26 extends radially inward from the inlet port 14 to the bore 20. The inlet passage 26 is formed by a drilling operation. Inlet passage 26 is connected with an axially extending portion 26a which communicates with an innermost end portion of bore 20, as best illustrated in FIG. 7B. The axially extending portion 26A is formed by a drilling process which is angularly offset by an angle α (approximately 10°) from the axis of the bore 20 so as to communicate between passage 26 and the end portion of bore 20. The drilling process involves inserting the drill bit into the bore 20 for forming the axially extending portion. As an alternative, as shown in FIG. 15, the valve body 12' can be formed with an axially extending portion 26a' that is formed by drilling from the outside of the valve body 12' inwardly so that the axially extending portion 26a' communicates with the passage 26. The end of the axially extending portion 26a' is then plugged by a ball plug (not shown).

With reference to FIGS. 7A, 7B, the first outlet port 16 communicates with a first primary outlet passage 28 and a first secondary outlet passage 30, each of which extend radially from the bore 20 of the valve body 12. A first common outlet passage section 32 extends generally perpendicular to the first primary outlet passage 28 and first secondary outlet passage 30 and connects with the first outlet port 16. The first primary outlet passage 28, first secondary outlet passage 30 and the first common outlet passage section 32 are each formed by a drilling process.

Figure 6:
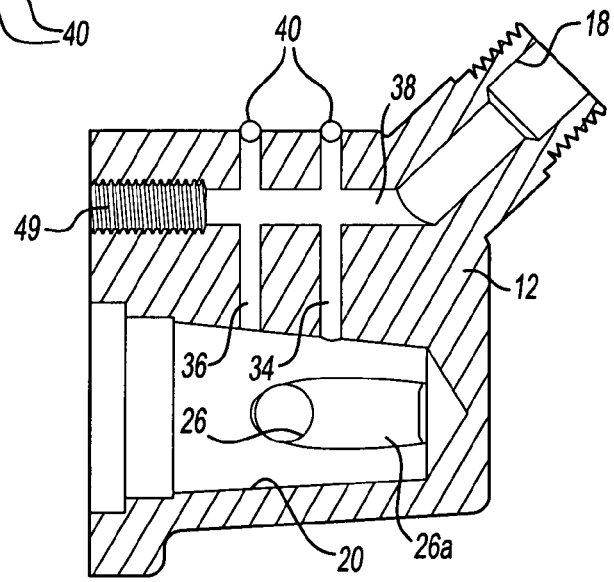
FIG. 6 is a cross-sectional view of the valve body taken along line 6—6 of FIG. 4.
Figure 13:
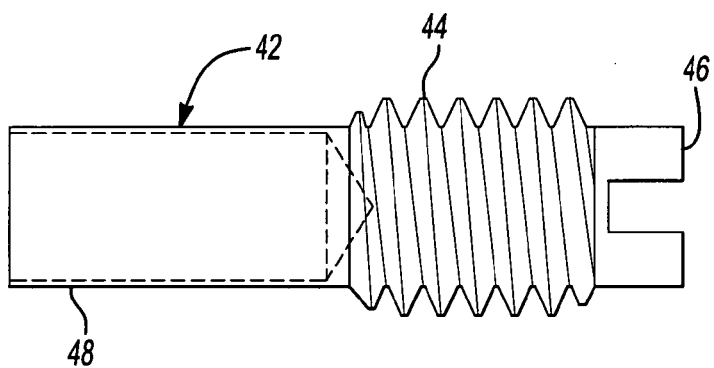
FIG. 13 is a plan view of an adjustment screw according to the principles of the present invention.
Figure 16:
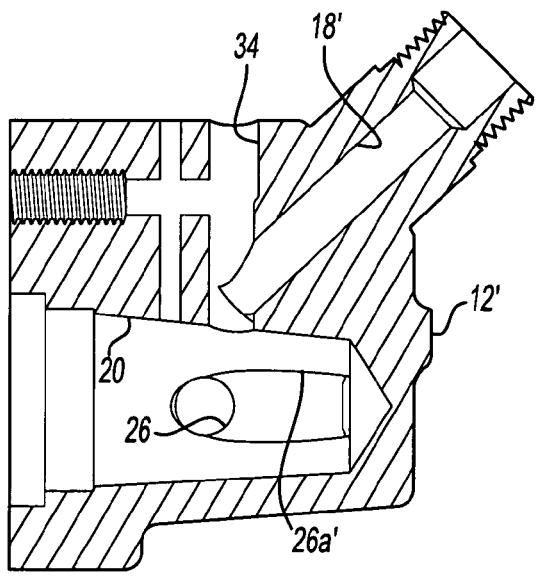
FIG. 16 is a cross-sectional view of the second embodiment of the valve body modified from FIG. 6.

With reference to FIG. 6, the second outlet port 18 communicates with a second primary outlet passage 34 and a second secondary outlet passage 36 which each extend radially outward from the bore 20 in the valve body 12 and communicate with a second common outlet passage 38 which extends generally perpendicular to the second primary outlet passage 34 and second secondary outlet passage 36 and connects with the second outlet port 18. The first and second primary outlet passages 28, 34, first and second secondary outlet passages 30, 36 and first and second common outlet passages 32, 38 are all formed by a drilling process in which the passages are each drilled from an exterior surface of the valve body 12. The ends of the first and second primary and secondary outlet passages 28, 30, 34, 36 are all plugged by balls 40 which are press fit into the respective passages and secured by swaging, or other known processes. As an alternative, as shown in FIG. 16, the second outlet port 18' can be formed to extend directly diagonally into communication with the second primary outlet passage 34. Returning reference to FIGS. 6 and 7A, a first end of the first and second common outlet passages 32, 38 each communicate with a respective one of the first and second outlet ports 16, 18, while a second end thereof is closed by an adjustment screw 42 (best shown in FIG. 13) which includes a threaded portion 44, a tool engaging portion 46, and a passage adjustment portion 48 which can be used to selectively adjust the size of the first and second secondary outlet passages 30, 36 by selectively covering a portion thereof. The threaded portion 44 engages internal threads 49 at the second end of common outlet passages 32, 38.

With reference to FIGS. 8–10, the valve member 22 will now be described in greater detail. Valve member 22 is a plug-type valve member including a body portion 52 that is generally cylindrical or conical in shape such that the exterior shape of the body portion 52 matches the interior surface of the bore 20 and valve body 12. A bore 54 is provided axially in the body portion 52. A radially extending slot 56 extends outward from the bore 54 through the body portion 52. The slot 56, as shown, extends approximately 165 degrees around the circumference of the body portion 52.

During assembly, the slot 56 is axially aligned with the first and second secondary outlet passages 30, 36 of the valve body 12. As will be described in greater detail herein, the valve member 22 can be rotated within the bore 20 of the valve body 12 to selectively align slot 56 with the first and second secondary outlet passages 30, 36. A first aperture 58 and a second aperture 60 extend radially outward from the bore 54 through the body portion 52 of the valve member 22 at a position axially spaced from the slot 56. In the assembled position of the valve member 22 and the bore 20 of valve body 12, the apertures 58, 60 are axially aligned with the first and second primary outlet passages 28, 34 of the valve body 12. The valve member 22 is rotatable within the bore 20 of the valve body 12 in order to selectively rotatably align the apertures 58, 60 with the first and second primary outlet passages 28, 34, as will be described in greater detail herein.

Figure 12:
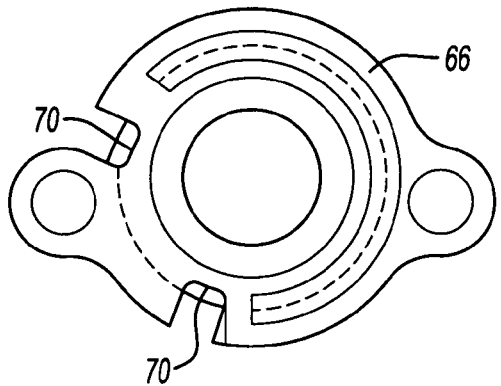
FIG. 12 is a plan view of a valve plug retainer cap according to the principles of the present invention.

The valve member 22 is retained in the bore 20 of the valve body 12, and the stem 24 is retained to the valve member 22 by a retainer cap 66 (best shown in FIG. 12) which is secured to the valve body 12 by a pair of screws 68. The retainer cap 66 includes tangs 70 which limit rotation of the valve member 22 by engaging flats 72, 74 (FIG. 8) provided on the valve member 22.

With reference to FIGS. 14A–14G, the different operating positions of the valve member 22 relative to the valve body 12 are shown for altering the position of the slot 56 relative to first and second secondary outlet passages 30, 36 and the position of apertures 58, 60 relative to first and second primary outlet passages 28, 34. As shown in FIG. 14A, the valve member 22 is in a completely closed position such that slot 56 is not rotationally aligned with either the first or second secondary outlet passage 30 or 36. Furthermore, the apertures 58, 60 are not aligned with either of the first or second primary outlet passages 28, 34. Thus, in the position shown in FIG. 14A, no fluid is delivered to either of the first or second outlet ports 16, 18.

With reference to FIG. 14B, valve member 22 is rotated 90 degrees in the counterclockwise direction so that slot 56 is rotationally aligned with first secondary outlet passage 30 and aperture 60 is aligned with first primary outlet passage 28. The combined flow through the first primary and secondary outlet passages 28, 30 provides a high flow operating mode for the first outlet port 16 while the second primary and secondary outlet passages 34, 36 which communicate with the second outlet port 18 are both closed.

With reference to FIG. 14C, the valve member 22 is rotated an additional 45 degrees to a 135 degree position such that slot 56 remains rotationally aligned with first secondary outlet passage 30, but neither aperture 58, 60 is aligned with either of the first or second primary outlet passages 28, 34. Thus, the first outlet port 16 is provided with a low flow via the first secondary outlet passage 30 being the only passage being opened.

With reference to FIG. 14D, the valve member is rotated an additional 45 degrees to a 180 degree position such that the slot 56 is rotatably aligned with both the first and second secondary outlet passages 30, 36 and the apertures 58, 60 are aligned with the first and second primary outlet passages 28, 34, respectively. In this position, high flow is provided to each of the first and second outlet ports 16, 18 due to the open condition of the first and second primary outlet passages 28, 34 and the first and second secondary outlet passages 30, 36.

With reference to FIG. 14E, the valve member 22 is rotated an additional 45 degrees to a 225 degree position such that the slot 56 is rotatably aligned with each of the first and second secondary outlet passages 30, 36 and neither of the apertures 58, 60 are aligned with either of the primary outlet passages 28, 34. Thus, the first and second outlet ports 16, 18 are each provided with a low flow operation condition due to the open first and second secondary outlet passages 30, 36.

With reference to FIG. 14F, the valve member 22 is rotated an additional 45 degrees to a 270 degree position so that the slot 56 is rotatably aligned with the second secondary outlet passage 36, but not the first secondary outlet passage 30. Furthermore, aperture 58 is aligned with the second primary outlet passage 34 while the first primary passage 28 is closed. Thus, the second outlet port 18 is provided with a high flow operating condition while the first outlet port 16 is provided with no flow.

With reference to FIG. 14G, the valve member 22 is rotated an additional 45 degrees to a 315 degree position in which the slot 56 is rotatably aligned with the second secondary outlet passage 36 and neither of the apertures 58, 60 are aligned with either of the first or second primary outlet passages 28, 34. Thus, only the second outlet port 18 is provided with a low flow operating condition via the fluid received through the first secondary outlet passage 30.

With the dual outlet valve of the present invention, multiple operating conditions can be obtained for the two outlet ports by the simple rotation of a single valve member. In particular, seven different operating conditions, including a closed condition, can be obtained with the dual outlet valve of the present invention.

In addition, intermediate positions of the valve member can also be utilized to provide intermediate flow conditions where the first and second primary outlet passages 28, 34 and the first and second secondary outlet passages 30, 36 are partially covered. In these intermediate positions, the valve member 22 can provide variable levels of flow.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve, comprising:
   a valve body including a main cavity, said valve body including an inlet passage in communication with said main cavity, a first pair of outlet passages in communication with said main cavity and a second pair of outlet passages in communication with said main cavity, said first pair of outlet passages each in communication with a first outlet port, said second pair of outlet passages each in communication with a second outlet port;
   a plug member rotatably disposed in said main cavity, said plug member including a bore extending axially from a first end of said plug member and a slot extending radially from said bore through a wall of said plug member, and a first and a second aperture each extending radially from said bore through said wall of said plug member, said plug member being rotatable to align said slot in communication with a first one of said first pair of outlet passages and in communication with a first one of said second pair of outlet passages, said plug member being rotatable to align said first aperture in communication with at least one of a second one of said first pair of outlet passages and a second one of said second pair of outlet passages and to align said second aperture with at least one of said second one of said first pair of outlet passages and said second one of said second pair of outlet passages.

2. The valve according to claim 1, wherein in a closed position of said plug member said slot and said first and second apertures are out of alignment with said first and second pairs of outlet passages.

3. The valve according to claim 1, wherein said plug member is positionable such that said slot is aligned with only one of said first one of said first pair of outlet passages and said first one of said second pair of outlet passages.

4. The valve according to claim 1, wherein said plug member is positionable such that said slot is aligned with only one of said first one of said first pair of outlet passages and said first one of said second pair of outlet passages and said first aperture is aligned with said second one of said second pair of outlet passages.

5. The valve according to claim 1, wherein said plug member is positionable such that said slot is simultaneously aligned with each of said first one of said first pair of outlet passages and said first one of said second pair of outlet passages.

6. The valve according to claim 1, wherein said plug member is positionable such that said slot is simultaneously aligned with each of said first one of said first pair of outlet passages and said first one of said second pair of outlet passages, said first aperture is aligned with said second one of said first pair of outlet passages and said second aperture is aligned with said second one of said second pair of outlet passages.

7. The valve according to claim 1, wherein said plug member is positionable such that said slot is simultaneously aligned with each of said first one of said first pair of outlet passages and said first one of said second pair of outlet passages and said first and second apertures are not aligned with said second one of said first pair of outlet passages and said second one of said second pair of outlet passages.

8. The valve according to claim 1, wherein said plug member is positionable such that said first aperture is aligned with said second one of said second pair of outlet passages while said second aperture is not aligned with said second one of said first pair of outlet passages.

9. The valve according to claim 1, further comprising a first adjustment mechanism, separate from said plug member, for adjusting a flow through said first one of said first pair of outlet passages.

10. The valve according to claim 9, further comprising a second adjustment mechanism, separate from said plug member, for adjusting a flow through said first one of said second pair of outlet passages.

11. The valve according to claim 10, wherein said first and second adjustment mechanisms each include an adjustment screw.

12. The valve according to claim 1, wherein said inlet passage in said valve body includes a radially extending passage extending from said main cavity to an external surface of said valve body.

13. The valve according to claim 12, wherein said inlet passage further includes a passage portion extending from said radially extending passage and communicating with an end portion of said main cavity.

14. The valve according to claim 1, wherein said inlet passage includes a first portion extending perpendicular to an axis of said main cavity and a second portion extending parallel to said axis of said main cavity and communicating with said first portion and an end portion of said main cavity.

* * * * *